I. C. TERRY.
CULTIVATOR HARROW.
APPLICATION FILED JULY 22, 1913.

1,101,356.

Patented June 23, 1914.
2 SHEETS—SHEET 1.

Witnesses
Frederich L. Fox,
K. Peacock

Inventor
Ira C. Terry.

By Victor J. Evans,
Attorney

COLUMBIA PLANOGRAPH CO., WASHINGTON, D. C.

I. C. TERRY.
CULTIVATOR HARROW.
APPLICATION FILED JULY 22, 1913.

1,101,356.

Patented June 23, 1914.
2 SHEETS—SHEET 2.

Witnesses
Frederick L. Fox.
K. Peacock

Inventor
Ira C. Terry.

By Victor J. Evans.
Attorney

UNITED STATES PATENT OFFICE.

IRA C. TERRY, OF MONROE, LOUISIANA.

CULTIVATOR-HARROW.

1,101,356.   Specification of Letters Patent.   Patented June 23, 1914.

Application filed July 22, 1913. Serial No. 780,487.

*To all whom it may concern:*

Be it known that I, IRA C. TERRY, a citizen of the United States, residing at Monroe, in the parish of Ouachita and State of Louisiana, have invented new and useful Improvements in Cultivator-Harrows, of which the following is a specification.

This invention relates to cultivator harrows and it consists in the novel features hereinafter described and claimed.

An object of the invention is to provide in a simple structure a combined implement of the character indicated which is adapted to simultaneously or approximately so harrow and cultivate the soil as it is passed over the same.

With the above and other objects in view the implement includes a beam provided at its rear end with a cross piece. Handles are attached to the beam and cruciform braces connect the intermediate portions of the handles with the cross piece. An upright is mounted at the rear end of the beam and a member is adjustably mounted upon the said upright. The beam is mounted upon a wheel supported standard and a cultivator point is carried at the forward portion of the beam. Standards depend from the side portions of the beam and bars are pivotally connected to the said standards. The said bars are arranged in pairs the members of which are located at the opposite sides of the beam. The pair of bars next adjacent the cultivator point are provided with harrow teeth or tongues and the bars behind the first mentioned bars are provided with sweeps or cultivator blades. The bars at the same side of the beam are pivotally connected together by links. Chain sections are connected at their forward ends with the forward portions of the beams and are connected at their rear ends with the said links and serve to limit the swinging movement of the said bars in an inward direction. At the same time the said chain sections permit the said bars to have ample oscillatory or turning movement upon their pivots to effectually operate or work in the soil. Chain sections are also connected with the said links and are connected with the said member adjustably mounted upon the said upright and they serve to limit the outward swinging movement of the rear portions of the bars.

Figure 1:
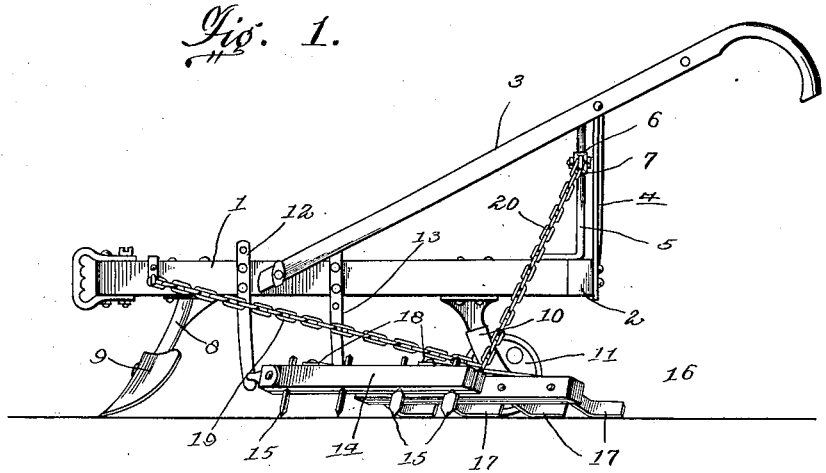
Figure 2:
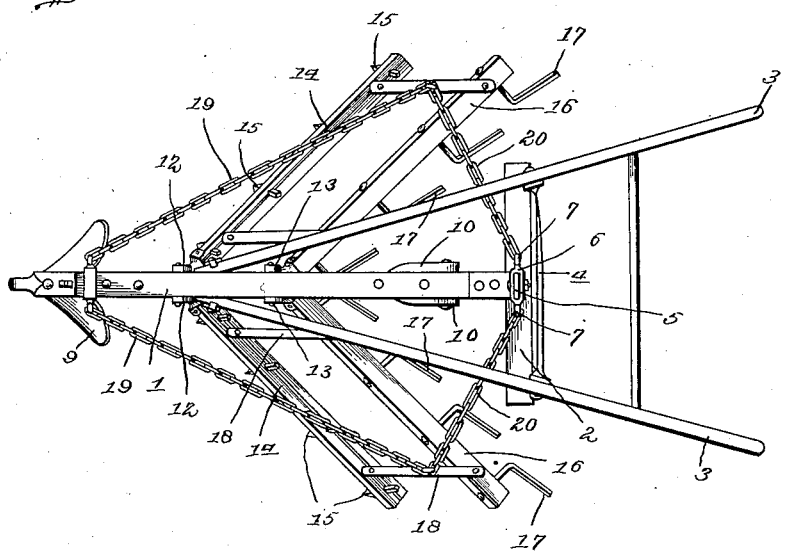
Figure 3:
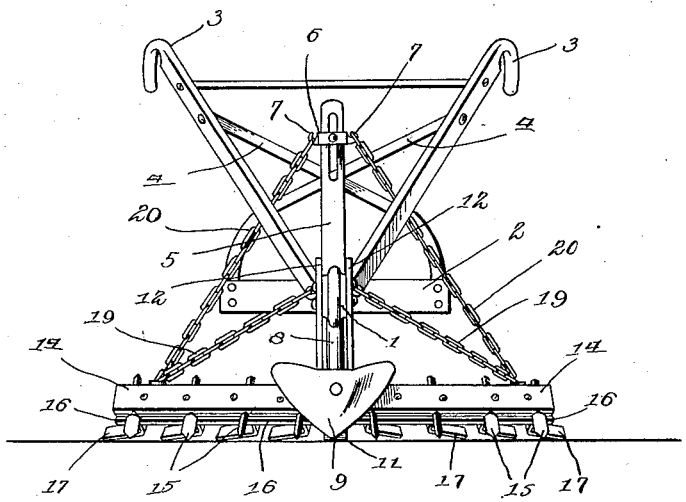
Figure 4:
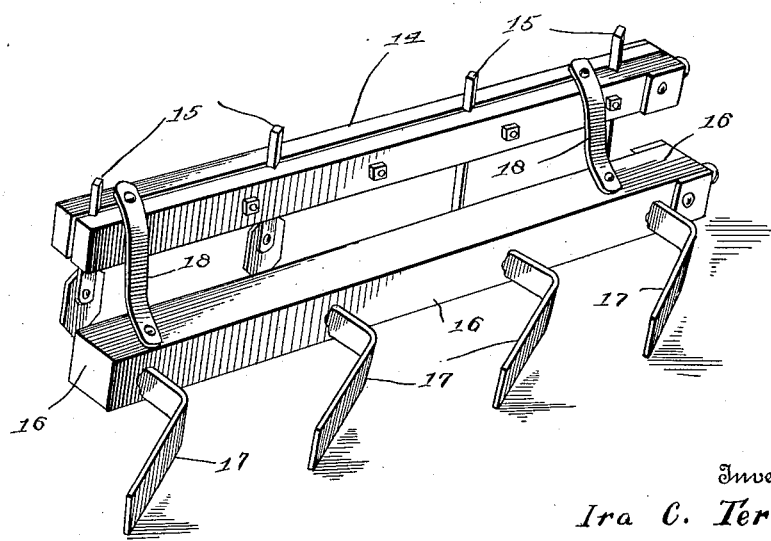

In the accompanying drawing:—Figure 1 is a side elevation of the harrow cultivator. Fig. 2 is a top plan view of the same. Fig. 3 is a front elevation of the same. Fig. 4 is a detailed perspective view of parts of the same.

The combined cultivator harrow comprises a beam 1 having at its rear end a cross piece 2. Handles 3 are mounted at the opposite sides of the intermediate portions of the beam 1 and cruciform braces 4 are connected at their lower ends with the end portions of the cross-pieces 2 and at their upper ends with the said handles 3. An upright 5 is mounted at the rear end of the beam 1 and a member 6 is adjustably mounted upon the said upright and is provided at its end with hooks 7. A standard 8 is carried at the forward portion of the beam 1 and a plow point 9 or plow plate is mounted at the lower portion of the said standard. Standards 10 are connected with the intermediate portion of the beam 1 and a wheel 11 is journaled between the standards 10 and is arranged to travel in the furrow opened by the point 9. Standards 12 depend from the forward portion of the beam and immediately behind the standard 8 and standards 13 extend down from the said beam behind the standards 12. Bars 14 are pivotally connected at their inner forward ends with the lower ends of the standards 12 and carry harrow teeth or tongues 15. Bars 16 are pivotally connected at their inner forward ends to the lower ends of the standards 13 and are provided at their rear sides with sweeps 17 which are adapted to travel along the surface of the soil and cultivate the same after the soil has been operated upon by the said harrow teeth.

The bars 14 and 16 are arranged in pairs and the members of the pairs are located at the opposite sides of the beam 1. The bars 14 and 16 at the same side of the beam 1 are pivotally connected together by means of links 18 whereby the bars at the same side of the beam are held in approximately parallel relation. Chain sections 19 are connected at the forward ends with the opposite sides of the beam 1 in advance of points of pivotal connection between the forward ends of the bars 14 with the standards 12, the rear ends of the said chain sections 19 being connected with the outermost links 18 in the vicinity of the rear ends thereof. Chain sections 20 are connected at their forward ends with the last mentioned links and at their rear end are engaged with the hooks 7 provided upon the member 6. The chain sections 19 are adapted to limit the inward swinging movement of the rear portions of the bars 14 and 16 and at the same time the said chain sections 19 are sufficiently pliable to permit the said bars to oscillate or turn within certain limits upon their pivotal connections with the standards 12 and 13. The chain sections 20 limit the outward swinging movement of the rear end of the bars 14 and 16. Therefore it will be seen that an implement of simple structure is provided and that as the implement is drawn between a row of standing plants the harrow teeth or tongues together with the point 9 will scarify the soil and at the same time the bars 14 which carry the harrow teeth or tongues may swing or turn in order to ride over obstructions. The sweeps following behind the harrow teeth or tongues will cultivate the soil and approximately smooth the same and partially fill the furrows which have been opened by the said harrow teeth.

Having described the invention what is claimed is:—

1. An implement as described comprising a beam, a point connected with the beam, bars pivotally connected with the beam behind the point and having teeth, other bars pivotally connected with the beam behind the first mentioned bars, links pivotally connecting the bars at the same side of the beam together, sweeps carried by the last mentioned bars.

2. An implement as described comprising a beam, a point connected with the beam, bars pivotally connected with the beam behind the point and having teeth, other bars pivotally connected with the beam behind the first mentioned bars and having sweeps, links pivotally connecting the bars at the same side of the beam together, chain sections connected at their forward ends with the beam and at the rear ends with the said links and chain sections connected at their forward ends with the links and at their rear ends with the rear portion of the beam.

3. An implement as described, comprising a beam, a point carried by the beam, bars pivotally connected with the beam behind the point and having teeth, other bars pivotally connected with the beam behind the first mentioned bars and carrying sweeps, links pivotally connecting the bars at the same side of the beam together, an upright mounted upon the beam, a member adjustably mounted upon the upright, chain sections connected at their forward ends with the beam in advance of the point of pivotal connection between the first set of bars and the beam, the rear ends of said chain sections being connected with the outermost links, other chain sections connected at their forward ends with the said links and connected at their rear ends with the said adjustable member.

IRA C. TERRY.

Attest:
TRAVIS OLIVER,
SAM SMITH.

Copies of this patent may be obtained for five cents each, by addressing the "Commissioner of Patents, Washington, D. C."